UNITED STATES PATENT OFFICE.

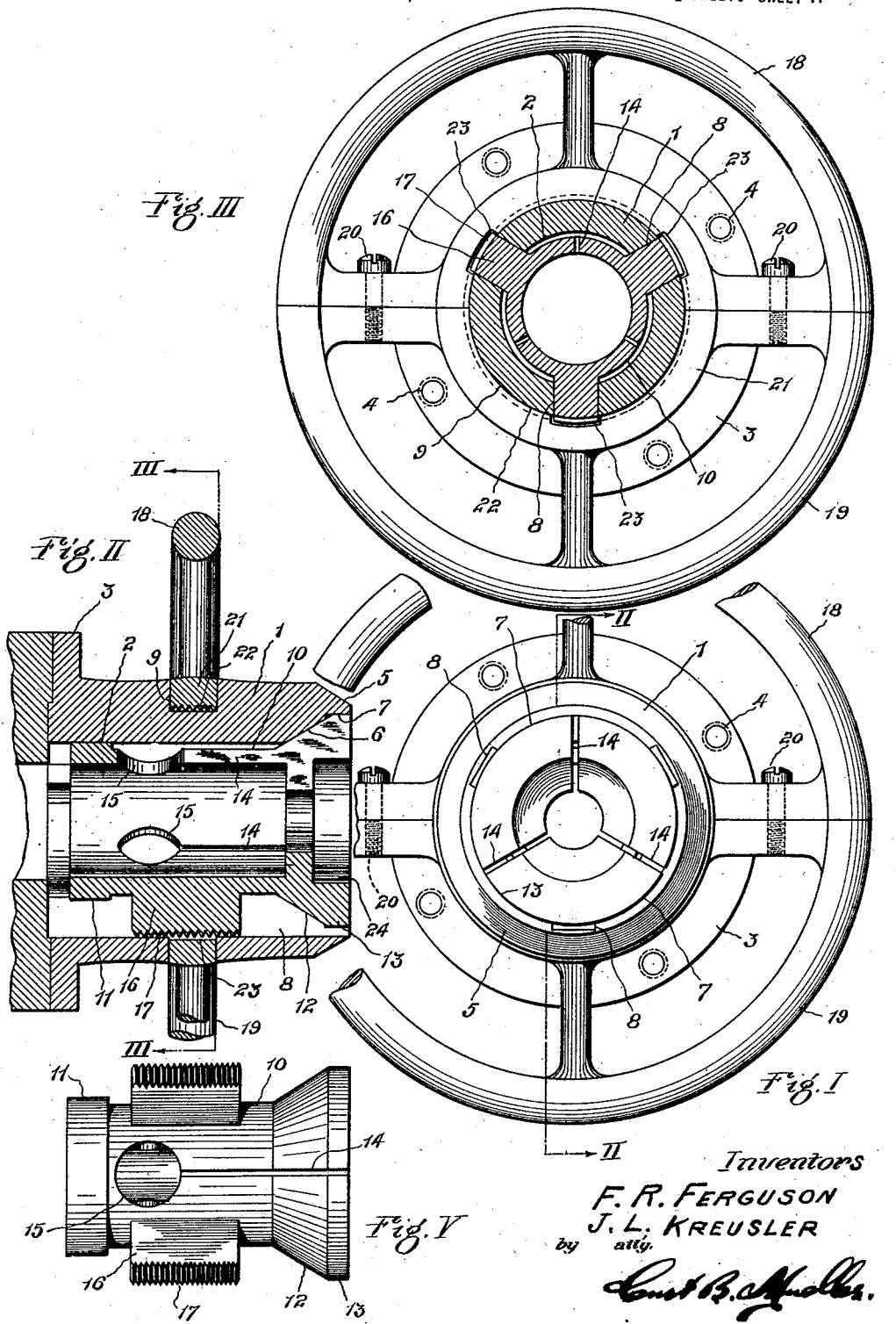

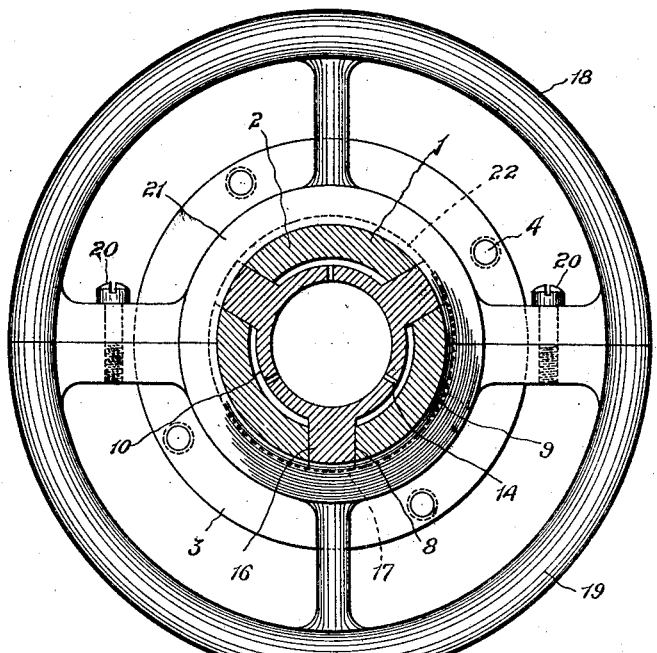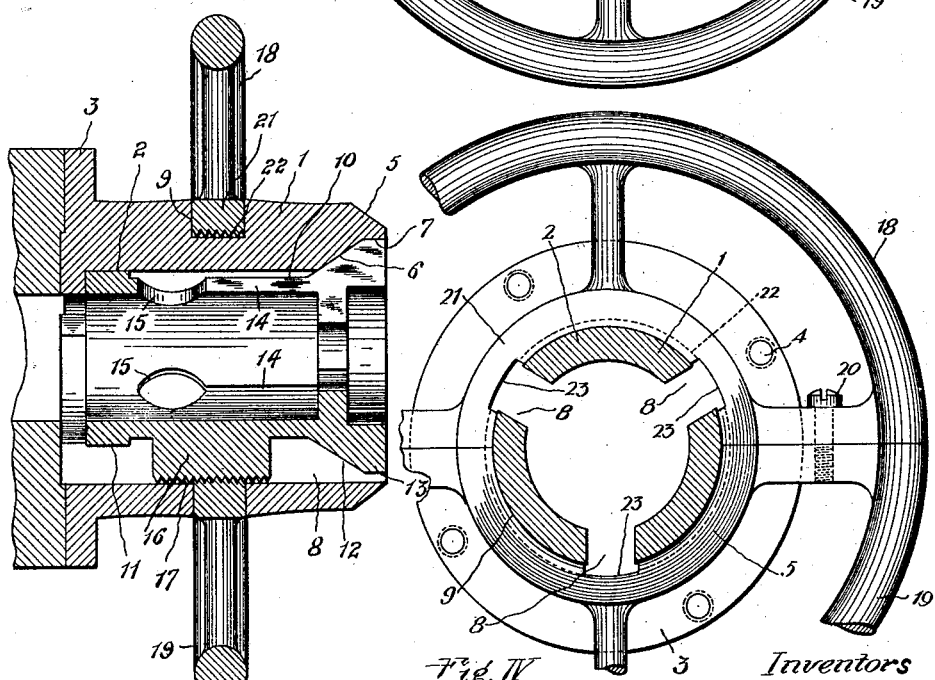

JOHN L. KREUSLER AND FERGUS R. FERGUSON, OF CLEVELAND, OHIO.

COLLET CHUCK.

1,407,760.   Specification of Letters Patent.   Patented Feb. 28, 1922.

Application filed December 12, 1918. Serial No. 266,458.

*To all whom it may concern:*

Be it known that we, JOHN L. KREUSLER and FERGUS R. FERGUSON, both citizens of the United States of America, both residing at 2365 E. 69th St., city of Cleveland, in the county of Cuyahoga and State of Ohio, have invented a new and useful Improvement in Collet Chucks, of which the following is a specification, the principle of the invention being herein explained and the best mode in which we have contemplated applying that principle, so as to distinguish it from other inventions.

Our invention relates to a collet chuck wherein the collet is of the expansible type, and wherein the whole may be said to consist of only three operative parts.

The object of our invention is to improve the construction and facility of operation of a device of this character in the several particulars now enumerated:

1. Positive action with very slight axial movement of the collet in the chuck.
2. Provision of an operating hand wheel close to the mouth of the collet.
3. Threaded connection between the collet and the hand wheel.
4. Double annular guides near the ends of the collet respectively.
5. Quick detachable collet to enable ready substitution of collets having different sized mouths.
6. Correspondingly spaced, circularly arranged, axially extending slots in the wheel threads and chuck adapted to come into registry to permit passage therethrough of threaded projections on collet.

Adverting to the drawing;

Fig. I is a front elevation, partly broken away, of a collet chuck embodying our invention looking into the mouth thereof.

Fig. II is a vertical section on line II—II of Figure I.

Fig. III is a relatively transverse vertical section on line III—III of Fig. II.

Fig. IV is a view corresponding to Fig. III with the collet removed to show the slots through the threads on the wheel in registry with the slots in the chuck.

Fig. V is a side elevation of the collet.

Figs. VI and VII are views corresponding to Figs. II and III respectively of a modification, wherein the threads are shown formed continuously around the hand wheel.

A hollow chuck 1 is provided with a central bore 2 and exteriorly at its rear side with a flange 3 fashioned with four openings 4 by means of which the structure as a whole may be secured to the head stock; the front exterior edge is tapered at 5. Interiorly, the mouth of the chuck is provided with a conical surface 6 flaring in a direction toward the mouth and terminating some distance from the latter in an annular surface 7. Three equi-spaced longitudinal grooves 8 extend from end to end and intersect all of the interior surface of the bore 2. Exteriorly, the chuck is fashioned about midway of its ends with a groove 9 which is of sufficient depth to open through each of the longitudinal grooves 8.

The collet consists of a shank 10 provided on its inner end with an annular shoulder 11 which is fitted to the diameter of the bore 2. The other or forward end of the collet is provided with a conical surface 12 substantially corresponding in extent and angularity to the conical surface 6 and adapted for sliding movement thereagainst. The extreme forward end of the collet is fashioned as an annular surface 13 adapted to be brought into juxtaposition with the annular surface 7. The collet is furthermore fashioned with the customary axially extending slots 14 terminating in circular openings 15 whereby the resiliency of the collet is obtained. Projecting from the shank 10 between the three openings 15 are three studs 16 corresponding in width to and adapted for movement along the longitudinal grooves 8. The peripheral sections of the studs 16 are fashioned with screw threads adapted, when the collet is inserted, to intersect the opposite sides of the groove 9.

The operating wheel is composed of two halves 18 and 19 adapted to be secured at abutting spokes by screws 20. The two halves of the wheel together form a ring 21 fitted for movement within the groove 9 as shown in Fig. II. The interior surface of this composite ring 21 is fashioned with screw threads 22 except for three equi-spaced cut-out channels 23. It is to be understood that the channels 23 are adapted to come into alignment and merge with the longitudinal grooves 8, whereby the insertion of the collet and particularly the free passage therethrough of the threaded stud 16 to their full depth is permitted. Thereafter, a turning of the wheel causes its threads 22 to engage with the threads 17 and move the collet either in or out depending upon the direction in which the wheel is turned and to thereby either contract the mouth of the collet or enable it progressively to expand in the usual manner. The mouth of the collet is recessed at 24 and may be supplied with hardened and ground bushings of various interior diameter, whereby corresponding adjustments may be effected as to the size of the mouth of the collet in order to grip or release work of correspondingly varying diameter with a minimum of axial movement of the collet.

It is to be observed that the gripping action of the collet is positive and by means of the bushing inserts may be caused to engage the work with a very slight movement imparted to the hand wheel. The collet is moreover guided at both ends, namely, at the surface 11 and the surfaces 12 and 13, whereby the work may be accurately centered. The provision of the channels through the screw threads 22 on the hand wheel has a manifest advantage of greatly facilitating the insertion or withdrawal of the collet preparatory to the substitution of another having either a larger or smaller mouth opening.

The modification to which Figs. VI and VII pertain, consists merely in the omission of the channel 23 so that while the collet must be drawn into place by continued rotation of the hand wheel after initial engagement of the cooperating threads on each, there is no likelihood of there ever being a disengagement between the threads on these two parts.

We claim:

1. A collet chuck comprising a hollow chuck fashioned internally with slots extending parallel to its axis and fashioned exteriorly with an annular groove in a plane perpendicular to its axis, said groove and slots having open communication, a hollow collet movably fitted in said chuck and having its walls provided with integral studs movable in said slots and across the plane of said groove and a ring movable in said groove and adapted to actuate said collet axially.

2. A collet chuck comprising a hollow chuck fashioned with longitudinal grooves and with an annular groove open at certain points to said longitudinal grooves, a hollow resilient collet having studs projecting radially outward from the relatively movable walls of said collet, said studs being movably fitted in said longitudinal grooves respectively, said studs being provided at their ends with screw threads, and a wheel in said annular groove having interrupted threads adapted to make and break engagement with said stud threads for the useful purpose specified.

3. A collet chuck comprising a hollow chuck having an annular exterior groove intermediately of its ends and an interior slot in open communication with each other, a resilient collet having a split portion and fitted in said chuck, said split portion carrying an integral stud adapted to project through the opening which affords the aforesaid communications, and a composite wheel fitted in said groove, said stud and wheel being provided with screw threads adapted to engage whereby the rotation of the latter moves said collet axially.

4. A collet chuck comprising a chuck and a hollow spring expansible collet in telescopic connection, said parts having one a groove and the other a projection so as to be directly locked against relative rotary movement while enabling relative movement therebetween in an axial direction, and an actuating contrivance in threaded connection with said collet through the chuck whereby the revoluble movement of said contrivance may actuate said collet in either axial direction, the arrangement being such that said parts may be separated by continued relative action in an axial direction when said threaded connection does not obtain.

5. A collet chuck comprising a chuck provided with a bore, the wall of the latter being in turn fashioned with a longitudinal groove having open communication radially through said chuck and at one end of said bore, a collet fitted in said chuck and provided with a stud axially movable in or entirely out of said groove, the outer surface of said stud being fashioned with screw threads, and a device provided with complementary screw threads adapted to engage with said stud threads, the threads on said device being interrupted by an axially extending channel adapted to be brought into registry with said chuck groove whereby the full insertion of said collet is facilitated and its quick detachment enabled preparatory to substitution of another.

6. A collet chuck comprising a chuck provided with a bore, the wall of the latter being in turn fashioned with longitudinal grooves extending from one end toward the other and each having open communication at one point radially through said chuck, a collet fitted in said chuck and provided with studs axially movable in said grooves, the outer surfaces of said studs being fashioned with screw threads, and a wheel provided with a hub having complementary screw threads adapted to engage with said stud threads, the threads on said hub being interrupted by channels circumferentially spaced as said chuck groves whereby the full insertion of said collet is facilitated.

7. A device of the character described comprising the combination with a hollow chuck having its bore fashioned with a longitudinal groove, and a collet provided with a radially directed threaded projection movable only along said groove, said chuck being furthermore fashioned with an annular groove communicating with the interior only through said longitudinal groove, and a threaded ring occupying said annular groove and adapted operatively to be connected to or disconnected from said stud solely by a turning movement thereof, the arrangement being such that when the threads on the studs and ring are disconnected the collet may be freely moved in an axial direction.

8. A device of the character described comprising the combination with a hollow chuck having its bore fashioned with longitudinally extending grooves and a collet provided with a corresponding number of radially directed projections similarly spaced as are said grooves and movable only therealong, the ends of said projections being threaded, said chuck being furthermore fashioned externally with an annular groove communicating with the interior only through said longitudinal grooves, and a ring occupying said annular groove and fashioned internally with arcuate channels spaced circumferentially like said longitudinal grooves whereby said projections may project into said channels, said ring being fashioned between said channels with cooperating threads whereby to engage said collet threads and enable axial movement thereof by turning said ring, or disengage and enable axial movement of said collet independently of ring movement.

9. A device of the character described comprising a chuck and a collet and a threaded ring in connection, the one part exteriorly with respect to a second part and interiorly with respect to the third part, one of said parts being formed with circularly arranged radially projecting studs provided with threads, said ring and stud threads adapted to cooperate, the other two of said parts being fashioned with correspondingly arranged openings and recesses respectively adapted to come into registry to permit the free axial movement of said studs.

10. A device of the character described comprising a chuck and a collet and a threaded ring in connection, the former with each of the latter, said collet being formed with a radial projection provided on its end with threads adapted to cooperate with said ring threads, said chuck and threaded ring portion being fashioned with correspondingly arranged openings and recesses respectively adapted to come into registry to permit a straight line axial movement of the threads on said studs past the thread on said ring.

Signed by us, this 9 day of Dec., 1918.

JOHN L. KREUSLER.
FERGUS R. FERGUSON.